US010791723B2

(12) United States Patent
Kuo-Hsuan

(10) Patent No.: US 10,791,723 B2
(45) Date of Patent: Oct. 6, 2020

(54) COMBINATION SPINNING REEL SEAT HANDLE SYSTEM

(71) Applicant: GLV International, LLC, Bellevue, WA (US)

(72) Inventor: Huang Kuo-Hsuan, Taichung (TW)

(*) Notice: Subject to any disclaimer, the term of this patent is extended or adjusted under 35 U.S.C. 154(b) by 91 days.

(21) Appl. No.: 16/219,261

(22) Filed: Dec. 13, 2018

(65) Prior Publication Data
US 2020/0187472 A1 Jun. 18, 2020

(51) Int. Cl.
A01K 87/06 (2006.01)

(52) U.S. Cl.
CPC .................... A01K 87/06 (2013.01)

(58) Field of Classification Search
CPC ........................................ A01K 87/06
USPC .................................................. 43/22
See application file for complete search history.

(56) References Cited

U.S. PATENT DOCUMENTS

| 2,855,718 | A | * | 10/1958 | Stephens | A01K 87/06 43/22 |
| 4,702,032 | A | * | 10/1987 | Ohmura | A01K 87/06 43/22 |
| 4,839,981 | A | * | 6/1989 | Yasui | A01K 87/06 43/18.1 R |
| 5,115,591 | A | * | 5/1992 | Oyama | A01K 87/08 43/22 |
| 5,199,207 | A | * | 4/1993 | Nakagawa | A01K 87/06 43/22 |
| 5,291,683 | A | * | 3/1994 | Yamato | A01K 87/06 43/22 |
| 6,374,534 | B1 | * | 4/2002 | Takizawa | A01K 87/06 43/22 |
| 2002/0069574 | A1 | * | 6/2002 | Ohmura | A01K 87/08 43/22 |
| 2016/0198689 | A1 | * | 7/2016 | Omura | A01K 87/00 43/22 |

FOREIGN PATENT DOCUMENTS

| CN | 207083919 U | | 3/2018 | |
| EP | 3117704 A1 | * | 1/2017 | ............ A01K 87/08 |
| EP | 3117705 A1 | * | 1/2017 | ............ A01K 87/08 |
| GB | 2043411 A | * | 10/1980 | ............ A01K 87/06 |
| WO | WO-2018034329 A1 | * | 2/2018 | ............ A01K 87/06 |

* cited by examiner

Primary Examiner — Christopher P Ellis
(74) Attorney, Agent, or Firm — Dean & Craine, PS

(57) ABSTRACT

A spinning reel handle system that includes a seat body with a hollow, rearward extending threaded neck. The seat body includes an upper curved surface, a concave lower surface and a rear neck cavity. Formed on the seat body are longitudinally aligned bores in which a blank is extended. Formed on the seat body are front and rear slots that receive the feet on a spinning reel. The system also includes a rotating nut with a cylindrical body. The cylindrical body is hollow and includes internal threads that engage the external threads on the neck. During assembly, the front and rear feet on the spinning reel are inserted into the front and rear slots. The nut is tightened onto the neck until it presses against the rear foot. The seat body includes a recessed void space that enables the fisherman to touch the blank with his thumb while gripping the seat body.

3 Claims, 4 Drawing Sheets

COMBINATION SPINNING REEL SEAT HANDLE SYSTEM

BACKGROUND OF THE INVENTION

1. Field of the Invention

This invention pertains to reel seats used on fishing rods. More particularly, this invention pertains to reel seats used with spinning reels.

2. Description of the Related

Spin reels and bait casting reels ban include a horizontal leg to fit against a compatible surface on a reel seat affixed to the fishing rod, hereinafter called a blank. In bait casting reels, the horizontal leg is mounted on a short stem attached to spool body and extends upward to support the spool above the reel seat. In spinning reels, the horizontal leg is mounted on a long stem that extends downward from the spool body. On a reel seat used with spinning reals, the horizontal leg is mounted on a compatible mounting surface formed on tie reel seat. In both types of reels, the ends of the horizontal leg, called feet, fit into a front slot and rear slot formed on the reel seat.

Chinese patent (CN2070839191J, issued on Mar. 18, 2018) incorporated herein, teaches a particular type of bait casting reel seat with an opened, curved cavity in which the horizontal leg on a bait casting reel is placed. The reel seat includes a seat body affixed to the blank so the blank passes through. The seat body includes a front section located adjacent to the curved cavity with a front slot formed thereon that captures the front foot on the horizontal leg. Also formed on the seat body is a rear section located on the opposite end of the curved cavity with a rear slot that captures the rear foot on the horizontal leg.

In the Chinese patent, the seat body also includes a rearward extending neck with external threads with a center bore through which the blank extends. The seat body is used with a rotating nut that includes a cylindrical body, a front abutment edge and a longitudinally aligned bore configured to enable the nut to be mounted on the blank behind the seat body. Formed on the inside surface of the cylindrical body are internal threads that engage the external threads on the neck. The seat body includes a rear cavity that surrounds the neck and communicates with the rear slot. During assembly, the cylindrical body is then axially aligned on the blank so the abutment edge faces the seat body. The casting reel is oriented upward above the curved cavity so the two feet are inserted into the two slots. The nut is placed over the neck and forced forward so the abutment edge is positioned inside the rear cavity. The nut is then rotated until it is positioned inside the rear cavity and captures the rear foot. Because the nut is partially hidden, the reel seat and nut form an attractive, uniform appearing handle system.

Bait casting reels are mounted above the blank and have spools with center axes transversely aligned with the longitudinal axis of the blank. Spinning reels are mounted below the blank and have spools with center axes aligned parallel to the longitudinal axis of the blank. Because of these differences, the techniques used by a fisherman when casting, releasing the line, and rewinding the line are different when using a bait casting reel and a spinning reel.

For example, when using a bait casting reel, the user grips the blank slightly behind the reel seat so the fisherman may use his thumb to press against the spool to control its rotation and the amount of line released when casting. Reel seats used with bait casting reels, may also include a downward curved wing located behind the spool enabling the fisherman to grip the blank.

With spinning reels, the fisherman's hand is positioned directly above the spool. Experienced fisherman typically extends his index finger below the blank and above the spool and presses against the front surface of the stem. The fisherman then uses the opposite hand to produce drag on the spool when casting to control the amount of line released.

When a fish nibbles at the bait on a hook, slight tension is exerted on the line and transferred to the blank. When the tension is perceived, the fisherman juggles the end of the blank up and down or side-to-side to slightly move the bait in the water. If the fisherman's hand is gripping a foam handle attached to the blank, tension, exerted on the blank by the fish may not be perceived in the handle.

What is needed is a combination spinning reel seat handle system used with a spinning reel oriented below the blank that enables a fisherman to cast in a normal manner. What is also needed is such a handle system with the appearance and the benefits of an elongated handle. What is also needed is such a handle system that enables the fisherman to perceive slight tension exerted on the blank while holding the blank with one hand around the spinning reel.

SUMMARY OF THE INVENTION

A combination spinning reel seat handle system that includes a seat body with an upper curved surface, a lower concave cavity and a rear neck cavity. Formed on the front and rear sections of the seat body are longitudinally aligned bores in which a blank is extended. The upper curved surface is configured to be used as a resting surface for the user's palm. The curved convex cavity is located below the upper curved surface and configured to receive the horizontal leg attached to a spinning reel. The convex cavity is configured to expose the lower surface of the blank. Formed on the front section is a front bore and a front slot. Formed on the rear section is a rear bore and a rear slot. During assembly, the blank extends between the front and rear bores and the horizontal leg on the spinning reel is position below the convex cavity. The spin reel is then lifted towards the convex cavity so the feet on a horizontal leg attached to the spinning reel are extended into the front and rear slots.

Extending rearward from the rear section is a threaded neck with a bore formed therein that is axially aligned with a front bore and rear bore formed on the front section and rear sections, respectively. The system also includes a rotating nut with a cylindrical body and a longitudinally aligned bore configured to be mounted on the blank behind the seat body. Formed on the inside surface of the cylindrical body are internal threads that engage the external threads on the neck. Attached over the cylindrical body is an elongated foam body.

During assembly, the seat body is securely attached to the blank. The nut and cylindrical body are then axially aligned on the blank so that the leading edge of the nut may extend into the rear cavity formed on the seat body. The feet on the horizontal leg on the stem of the spinning reel are then inserted into the front and rear slots. The nut is then forced forward so that it leading edge, also called an abutment edge, is positioned inside the rear cavity and over the rear foot. As the nut is rotated, the internal threads mesh with the external threads on the neck with further advances over the rear foot pinning it inside the rear slot.

The depth of the rear cavity and the width of the nut are sufficient so that the nut is fits into the rear cavity and covered by the seat body. The nut body is hidden from view when fully tightened on the neck. Disposed around the cylindrical body is a cylindrical foam body. In one embodiment, the foam body and the seat body are approximately the same diameters thereby creating a continuous, uniform appearing structure.

Formed on the upper surface on the front section of the seat body is a U-shaped recessed void space. During use, the fisherman positions the palm of one hand over the upper curved surface. The fisherman then grips the reel seat by extending the index finger downward and across the front surface of the stem attached to the spinning reel. The fisherman then wraps his middle, ring and little finger around the blank. The user also extends his thumb forward over the recessed void space so the bottom of the thumb touches the exposed portion of the blank located in the recessed void space. And slight tension exerted on the blank may be perceived by user's thumb.

DESCRIPTION OF THE PREFERRED EMBODIMENT(S)

Figure 1:
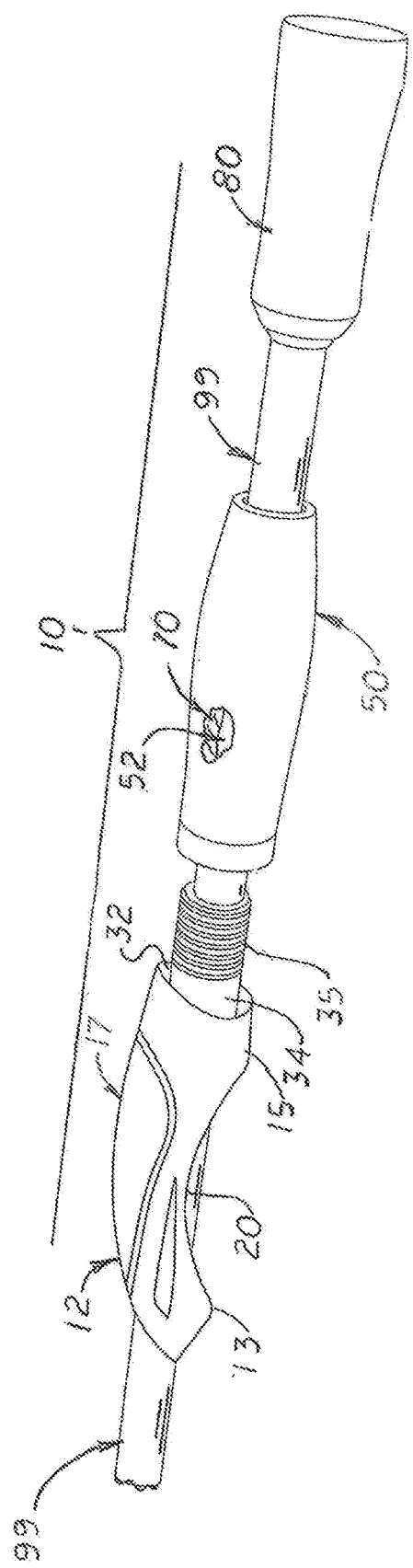
FIG. 1 is an exploded perspective view of a combination spinning reel seat handle system.

Referring to the Figs, there is shown a combination spinning reel seat handle system 10 that includes, a seat body 12 with an upper curved surface 17, a lower concave cavity 20 and a rear cavity 31. The seat body 12 also includes a front section 13 and a rear section 15 located on opposite sides of the lower concave cavity 20. The front section 13 and rear section 15 both include axially aligned bores 14, 16, respectively, that communicate with the lower concave cavity 20. Formed on the front section 13 below the bore 14 is a front slot 18. Formed on the rear section 14 below the bore 16 is a rear slot 19 (see FIG. 2).

The upper curved surface 17 is configured to be a resting surface for the user's palm. The lower convex cavity 20 is below the upper curved surface 17 and configured to receive the horizontal leg 104 attached to the stem 102 on a spinning reel 100. In the embodiment shown, the lower convex cavity 20 has a curvature sufficient so a large section of the bottom surface of the blank 99 is exposed. During assembly, the front foot 106 on the horizontal leg 104 is inserted into the front slot 18 and the rear foot 108 on the horizontal leg 104 is inserted in the rear slot 19.

Extending rearward from the rear section 15 is a neck 34 with external threads 35 that extend approximately the entire length of the neck 34. Formed inside the neck 34 is a center bore 36. The neck 34 is aligned on the seat body 12 so the center bore 36 is axially aligned with the front and rear bores 14, 16, on the front and rear sections 13, 15, respectively.

The system 10 also includes a rotating nut 50 with a cylindrical body 52, a longitudinally aligned bore 54 formed therein, and a front abutment edge 56. The nut 50 is larger in diameter than the cylindrical body 52 and configured to fit into the rear cavity. Formed on the inside surface of the cylindrical body 53 are internal threads 58 that engage the external threads 35 on the neck 36. The internal threads 58 are located near the mid-line axis of the cylindrical body 52 so that when the nut 50 is disposed over the neck 34 and force forward, the threads 58 on the nut 50 meshes with the threads 35. As the nut 50 is rotated, it travels forward into the rear cavity 32. The proximal section of the rear slot 19 is open and communicates with the rear cavity 32 so that as the nut 50 is forced over the neck 32, it travels over the rear foot 108 on the horizontal leg 104 to hold the spinning reel 100 on the reel seat 12.

The depth of the rear cavity 32 and the width of the nut 50 are sufficient so the nut 50 fits inside the rear cavity when tightened onto the neck 34 and covered by the seat body 12 and hidden from view. Attached over the cylindrical body 53 is an elongated grip body 70 made of foam. The diameter of the grip body 70 is approximately the same as the distal end of the seat body 12 creating a uniform appearing structure.

Figure 2:
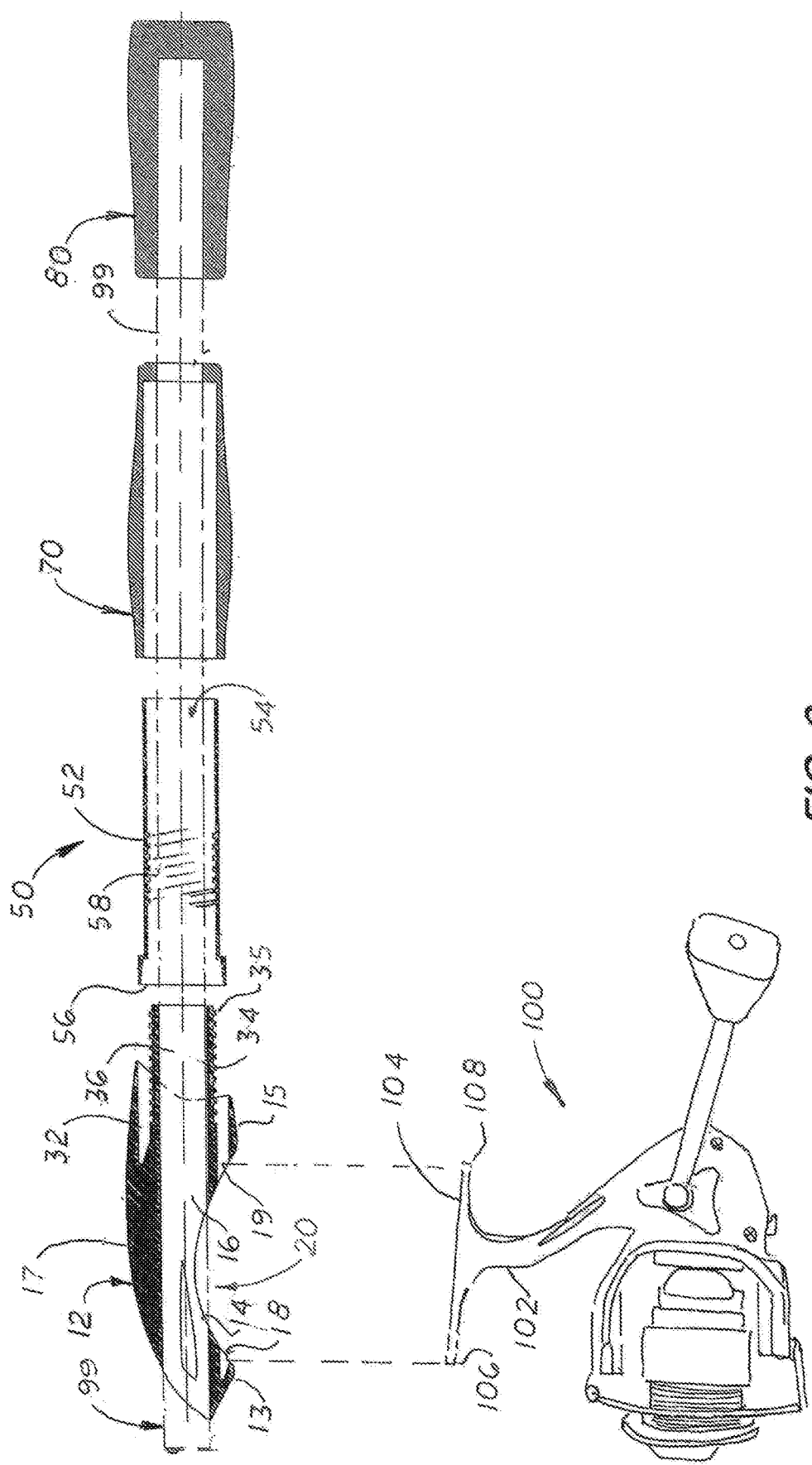
FIG. 2 is an exploded, sectional view of the handle system shown in FIG. 1 showing a spinning reel being inserted into the lower cavity on the seat body.
Figure 3:
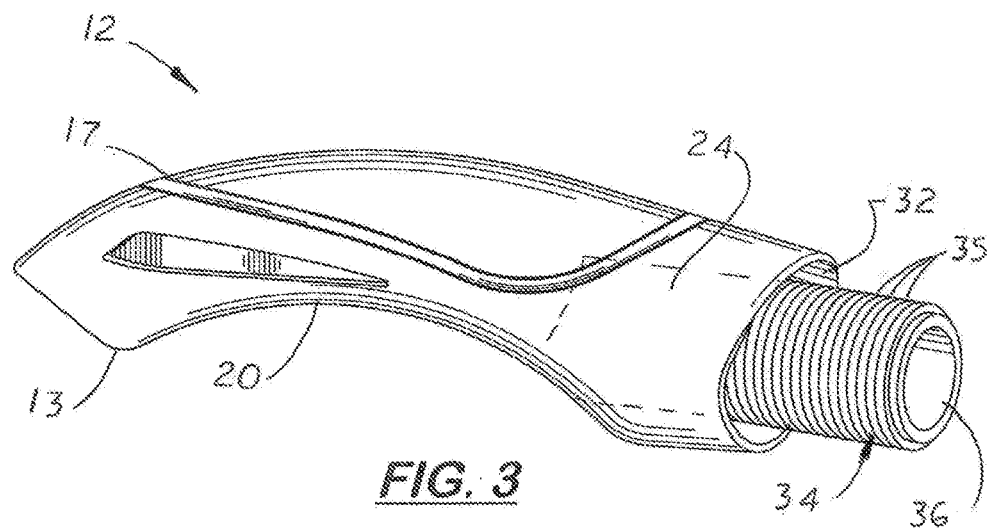
FIG. 3 is a rear perspective view of the seat body.
Figure 4:
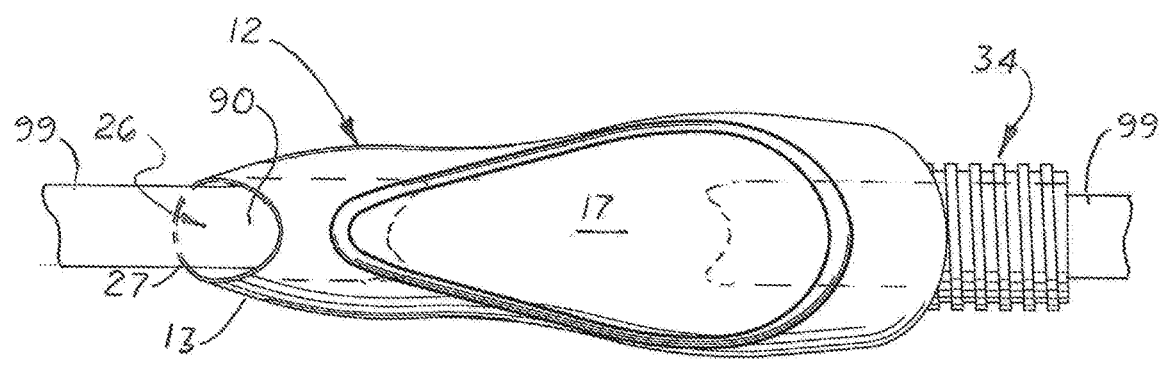
FIG. 4 is a top plan of the seat body mounted on a blank.
Figure 5:
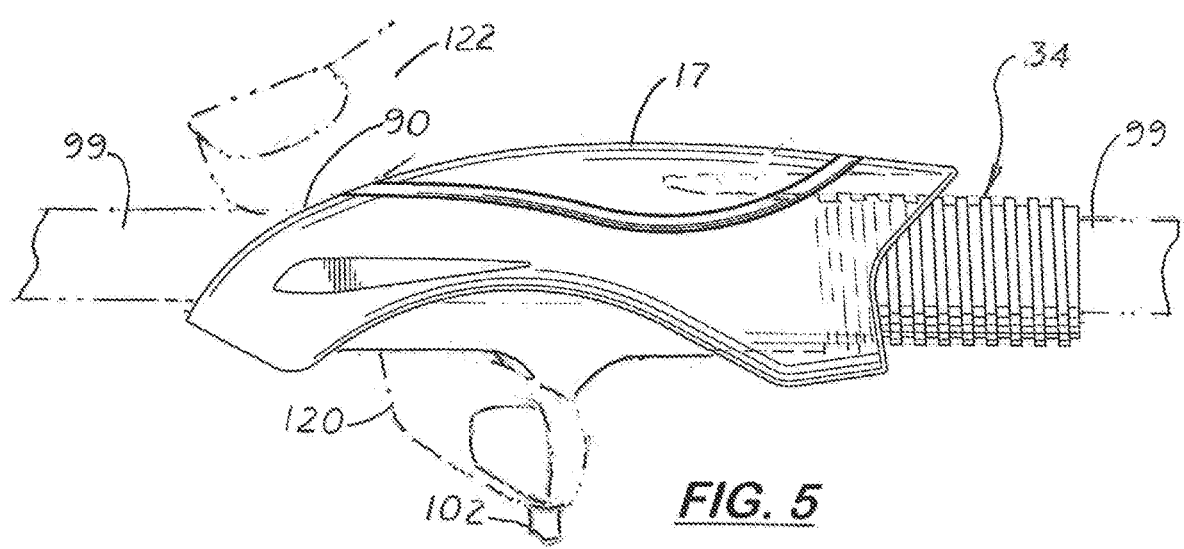
FIG. 5 is a right elevational view of the seat body showing the relative location of the stem on a spinning reel when mounted onto the seat and showing the user's index finger extending around the stem and the user's thumb extending forward and touching the expose surface of the blank located in the recessed area.
Figure 6:
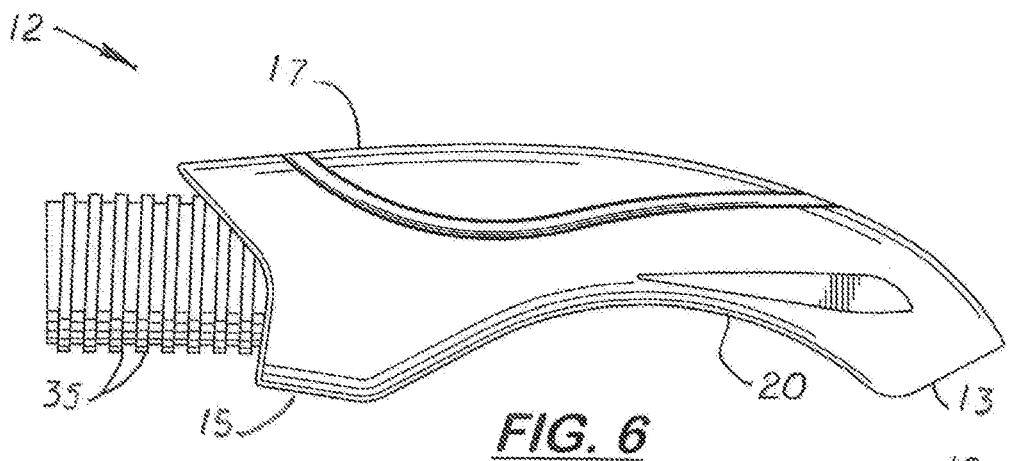
FIG. 6 is a left devotional view of the seat body.
Figure 7:
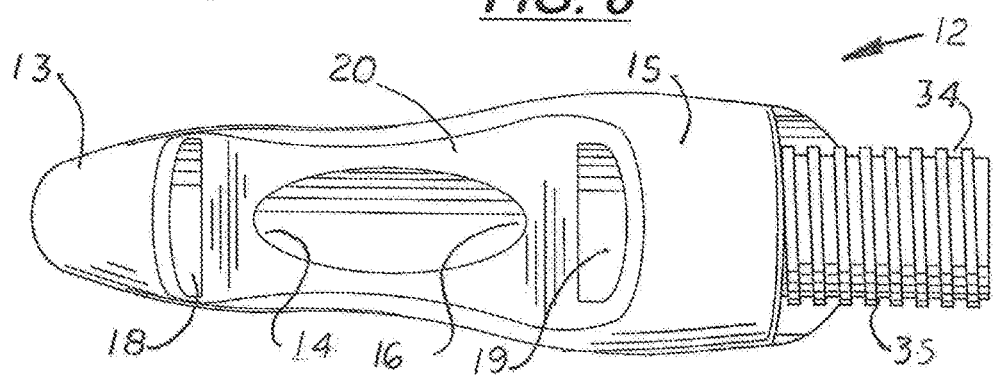
FIG. 7 is a bottom plan view of the seat body.
Figure 8:
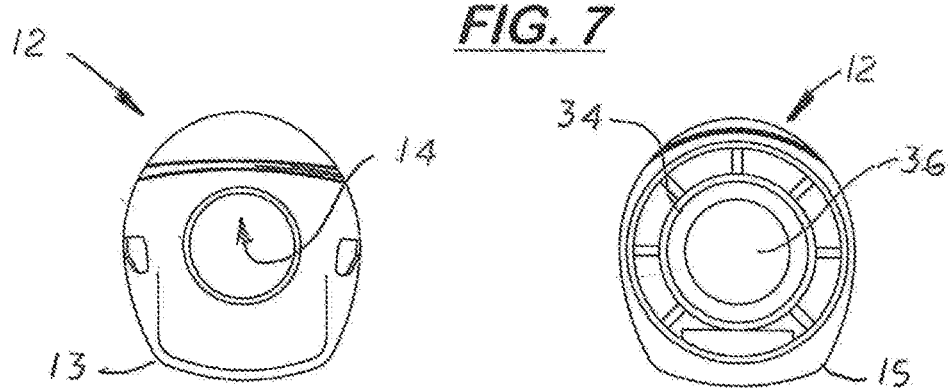
FIG. 8 is a front elevational view of the seat body.
Figure 9:
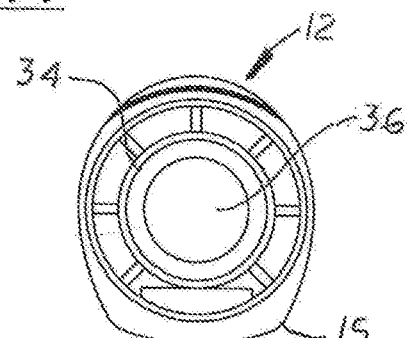
FIG. 9 is a rear elevational view of the seat body.
Figure 10:
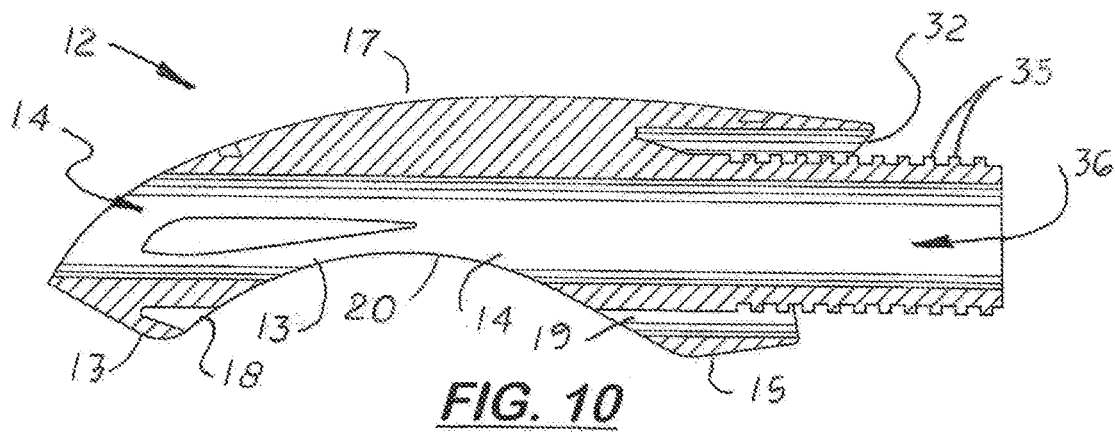
FIG. 10 is a sectional side elevational view of the seat body.

Formed on the upper surface on the front section 13 of the seat body 12 is a recessed void space 90. In the embodiment shown, the void space 90 is U-shaped. During use, the fisherman positions the palm of one hand over the upper curved surface 17. The fisherman then grips the stem 102 using his index finger 120 as shown in FIG. 2. The middle, ring and little fingers (not shown) are then wrapped around the section of blank 99 behind the stem 102. The user then extends his thumb 99 forward so it touches the exposed portion of the blank 99 in the recessed void space 90. And slight tension exerted on the blank 99 may be perceived by user's thumb 122. Attached to the proximal end of the blank is an optional handle 80.

During assembly, the seat body 12 is securely attached to the blank 99. The cylindrical body is then axially aligned on the blank 99 so the abutment edge 56 faces the seat body 12. The feet 106, 108 on the horizontal leg 104 on the spinning reel 100 is then inserted into the front and rear slots 18, 19. The nut 50 is then forced forward so the abutment edge 56 is positioned inside the rear cavity 32 so that the internal threads 58 mesh with the external threads 35 formed on the neck 50. The nut 50 is then rotated to tighten on the neck forcing the nut 50 and the abutment surface 56 against and over the rear foot 19 to securely hold the spinning reel 100 on the seat body 12.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A combination spinning reel seat and handle system (10) configured to mount a spinning reel (100) on a blank (99), said system (10), comprising:

a. a reel seat body (12) configured to be selectively mounted near the proximal end of a blank (99), said reel seat body (12) includes a front section (13), a rear section (15), a curved upper surface (16), a lower concave surface (20), a front bore (13) formed on said front section (13) and a rear bore (16) formed on said rear section (15), said front section (13) includes a front slot (18) configured to receive a front foot (106) on a spinning reel (100), said rear section (15) includes a rear slot (19) configured to receive a rear foot (108) on a spinning reel 100, said rear section (15) includes a rear cavity (32) configured to communicate with said rear slot (19), extending from said rear cavity (32) is a rearward extending neck (34) with a center bore (36) formed therein that is axially aligned with said front bore (14) and said rear bore (16), said neck (34) includes external threads (35);

b. a cylindrical nut 50 that includes a cylindrical body (52) with a longitudinally aligned bore (54) formed therein, said cylindrical body (52) configured to extend into said rear cavity (32) when said cylindrical body (52) is axially aligned with said neck (34), said cylindrical body (52) includes internal threads (58) said internal threads (58) configured to mesh with said external threads (35) on said seat body (12); and c. whereby a blank (99) is inserted into said front bore (14) and into said rear bore (16) on said seat body (12) and into said bore (54) formed on said cylindrical body (52), and a stem (102) on a spinning reel (100) is positioned below said concave lower surface (20) and feet (106), (108) on said stem (102) are inserted into said front slot (18) and said rear slot (16), and said nut (50) is then aligned with said neck (34) and moved longitudinally and into said rear cavity (32), said internal threads (58) mesh with said external threads (35) on said neck (34) and forces said cylindrical nut (50) against said rear foot (108) on said spinning reel (100) to hold said spinning reel (100) on said seat body (12).

2. The system, as recited in claim 1, further including a recessed void space (96) formed on said upper curved surface (17) over said front section (13).

3. The system, as recited in claim 1, further including a grip handle (70) configured to fit over said cylindrical body (52).

\* \* \* \* \*